United States Patent
Kido

(10) Patent No.: US 8,670,612 B2
(45) Date of Patent: Mar. 11, 2014

(54) ENVIRONMENT RECOGNITION DEVICE AND ENVIRONMENT RECOGNITION METHOD

(75) Inventor: Shinnosuke Kido, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/460,972

(22) Filed: May 1, 2012

(65) Prior Publication Data

US 2012/0288191 A1 Nov. 15, 2012

(30) Foreign Application Priority Data

May 12, 2011 (JP) .................................. 2011-107694

(51) Int. Cl.
*G06K 9/00* (2006.01)
(52) U.S. Cl.
USPC .......................................... 382/165; 382/104
(58) Field of Classification Search
USPC ......................... 382/165, 103–104, 181, 224;
340/435–439, 580, 905; 701/300–302;
348/148
See application file for complete search history.

(56) References Cited

U.S. PATENT DOCUMENTS

| | | | | |
|---|---|---|---|---|
| 5,706,355 | A * | 1/1998 | Raboisson et al. ............ | 382/104 |
| 6,480,624 | B1 * | 11/2002 | Horie et al. .................... | 382/165 |
| 7,652,584 | B2 * | 1/2010 | Fridthjof ........................ | 340/580 |
| 7,668,341 | B2 * | 2/2010 | Miyajima et al. ............. | 382/104 |
| 8,036,427 | B2 * | 10/2011 | Nakamori et al. ............. | 382/104 |
| 8,050,456 | B2 * | 11/2011 | Nakamori et al. ............. | 382/103 |
| 8,238,652 | B2 * | 8/2012 | Ono ............................... | 382/165 |
| 8,350,910 | B2 * | 1/2013 | Capello et al. ................ | 348/148 |
| 8,391,555 | B2 * | 3/2013 | Sakamoto ...................... | 382/104 |
| 8,483,479 | B2 * | 7/2013 | Kunkel et al. ................. | 382/165 |
| 2012/0288150 | A1 * | 11/2012 | Kido ............................. | 382/103 |
| 2012/0288151 | A1 * | 11/2012 | Kido ............................. | 382/103 |
| 2013/0249684 | A1 * | 9/2013 | Hatakeyama et al. ......... | 340/435 |

FOREIGN PATENT DOCUMENTS

JP 3349060 B2 11/2002

\* cited by examiner

*Primary Examiner* — Ishrat I Sherali
(74) *Attorney, Agent, or Firm* — McDermott Will & Emery LLP

(57) ABSTRACT

There are provided an environment recognition device and an environment recognition method. The device obtains luminances of a target portion in a detection area, assigns a color identifier to the target portion according to the luminances thereof based on an association, retained in a data retaining unit, between a color identifier and a luminance range, groups target portions, of which position differences in the width and height directions are within a predetermined range and to which one or more color identifiers corresponding to a same specific object are assigned, into a target object, based on a association, retained in the unit, between a specific object and the color identifier; and determines an outer edge specified by the target portions to which the color identifiers are assigned according to whether or not the detection area is in the environment where light is diffused, as the outer edge of the target object.

8 Claims, 13 Drawing Sheets

FIG. 4

| COLOR IDENTIFIER | | 1 | 2 | 3 | 4 | 5 | 6 | 7 | 8 |
|---|---|---|---|---|---|---|---|---|---|
| OVERVIEW | | LIGHT RED | YELLOW | LIGHT BLUE-GREEN | RED | DARK RED | DARK YELLOW | BLUE-GREEN | DARK BLUE-GREEN |
| LUMINANCE RANGE | RED | ≥220 | ≥110 | ≥80 | ≥200 | ≥150 | ≥80 | ≥80 | ≥40 |
| | GREEN | ≤80 | ≥110 | ≥150 | ≤50 | ≤30 | ≥80 | ≥140 | ≥70 |
| | BLUE | ≤80 | ≤50 | ≥150 | ≤50 | ≤30 | ≤30 | ≥140 | ≥70 |

FIG. 5

| SPECIFIC OBJECT | TRAFFIC LIGHT (RED) | TRAFFIC LIGHT (YELLOW) | TRAFFIC LIGHT (BLUE) | TAIL LAMP (RED) | TURN SIGNAL (ORANGE) | ROAD SIGN (YELLOW) | ROAD SIGN (BLUE) | ROAD SIGN (GREEN) |
|---|---|---|---|---|---|---|---|---|
| REPRESENTING COLOR IDENTIFIER | 1 | 2 | 3 | 4 | 5 | 6 | 7 | 8 |
| SUB COLOR IDENTIFIER | 4 | 6 | 7 | 6 | 6 | - | 8 | - |
| WIDTH RANGE (m) | 0.2 TO 0.4 | 0.2 TO 0.4 | 0.2 TO 0.4 | 0.1 TO 0.2 | 0.1 TO 0.2 | 0.3 TO 1.0 | 0.3 TO 1.0 | 0.3 TO 1.0 |

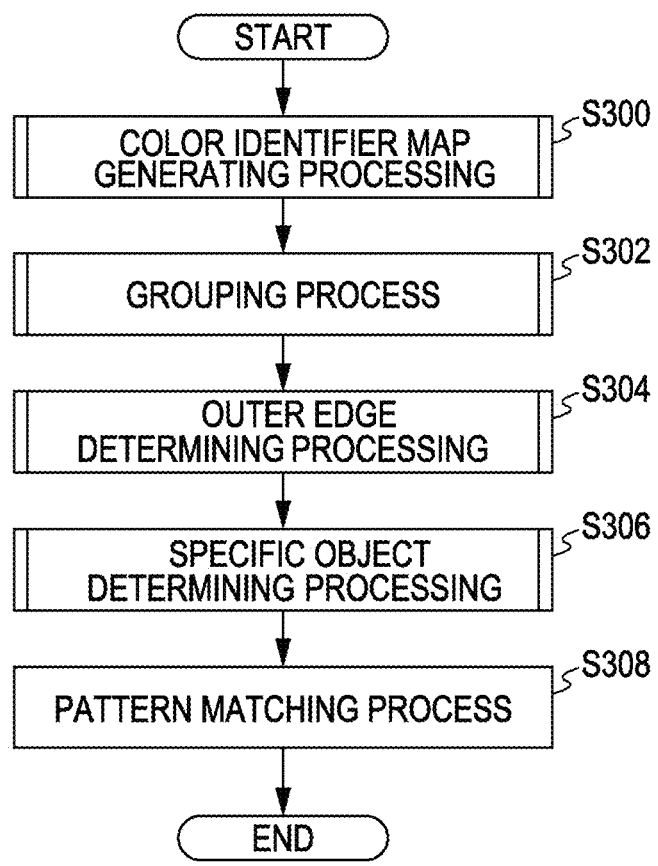

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-107694 filed on May 12, 2011, the entire contents of which are hereby incorporated by reference.

BACKGROUND OF THE INVENTION

1. Field of the Invention

The present invention relates to an environment recognition device and an environment recognition method for recognizing a target object based on a luminance of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle for example, Japanese Patent No. 3349060 (Japanese Patent Application Laid-Open (JPA) No. 10-283461)

Further, in such techniques, there is a technique that performs more advanced control. Specifically, it not only specifies a target object simply as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

For example, when the captured image is a color image, there may be a method for grouping pixels with a similar luminance (color) and extracting the pixels as a target object.

When it is raining or snowing, the captured image is such that light of a target object such as a traffic light is diffused due to water droplets deposited onto a front window, or streak caused by cleaning the water droplets. Therefore, if a plurality of pixels with similar color characteristic is simply grouped, the target object from which emitted light is diffused as described above might be recognized to be larger than the actual size thereof.

BRIEF SUMMARY OF THE INVENTION

In view of such problems, it is an object of the present invention to provide an environment recognition device and an environment recognition method that improve the efficiency and accuracy of specifying a target object in order to avoid false recognition in an environment where light is easily diffused such as in rainy weather.

In order to solve the above problems, an aspect of the present invention provides an environment recognition device that includes: a data retaining unit that retains association between a predetermined number of color identifiers and each luminance range, retains association between one or more color identifiers and a specific object, and retains association between a combination of one or more color identifiers selected from the color identifiers and each detection result as to whether a detection area is in an environment where light is diffused; a luminance obtaining unit that obtains a luminance of a target portion in the detection area of a luminance image; a color identifier assigning unit that assigns a color identifier to the target portion according to the luminance of the target portion based on the association between the color identifier and the luminance range retained in the data retaining unit; a grouping unit that groups target portions which are assigned one of color identifiers associated with a same specific object, and of which positions differences in the horizontal and vertical directions are within a predetermined range, based on the association between a specific object and a color identifier retained in the data retaining unit; an environment determining unit that determines whether or not the detection area is in an environment where light is diffused; and an outer edge determining unit that selects the combination according to whether the detection area is in the environment where light is diffused and determines that an outer edge specified by a target portion assigned a color identifier included in the selected combination is an outer edge of the target object.

The environment recognition device may further include a rainfall detecting unit that detects rainfall. Besides, the environment determining unit may determine that the detection area is in the environment where light is diffused, when the rainfall detecting unit detects rainfall.

The environment recognition device may further include a snowfall detecting unit that detects snowfall. Besides, the environment determining unit may determine that the detection area is in the environment where light, is diffused, when the snowfall detecting unit detects snowfall.

The data retaining unit may retain association between a combination of color identifiers selected from the color identifiers and each level of the light, diffusion condition. The environment determining unit may determine the light diffusion condition in a stepwise manner. The outer edge determining unit may select the combination according to the light diffusion condition, and determine that an outer edge specified by a target portion assigned, a color identifier in the selected combination is the outer edge of the target object.

In order to solve the above problems, another aspect of the present invention provides an environment recognition method that includes obtaining a luminance of a target portion in a detection area of a luminance image; assigning a color identifier to the target portion according to the luminance of the target portion based on an association between a color identifier and a luminance range retained in a data retaining unit; grouping target portions which are assigned one of one or more color identifiers associated with a same specific object, and of which positions differences in the horizontal and vertical directions are within a predetermined range, based on the association between a specific object and a color identifier retained in the data retaining unit; determining whether or not the detection area is in an environment where light is diffused; selecting a combination according to whether or not the detection area is in the environment where light is diffused, based on an association, retained in the data retaining unit, between each detection result as to whether or not the detection area is in the environment where light is diffused and a combination of color identifiers selected from the color identifiers; and determining that an outer edge of specified by the target portion assigned a color identifier included in the selected combination is the outer edge of the target object

BRIEF DESCRIPTION OF THE SEVERAL VIEWS OF THE DRAWINGS

FIG. 4 is an explanatory diagram for explaining a color table;

FIG. 5 is an explanatory diagram for explaining a specific object table;

FIG. 10 is a flowchart illustrating an overall flow of an environment recognition method;

DETAILED DESCRIPTION OF THE INVENTION

Figure 1:
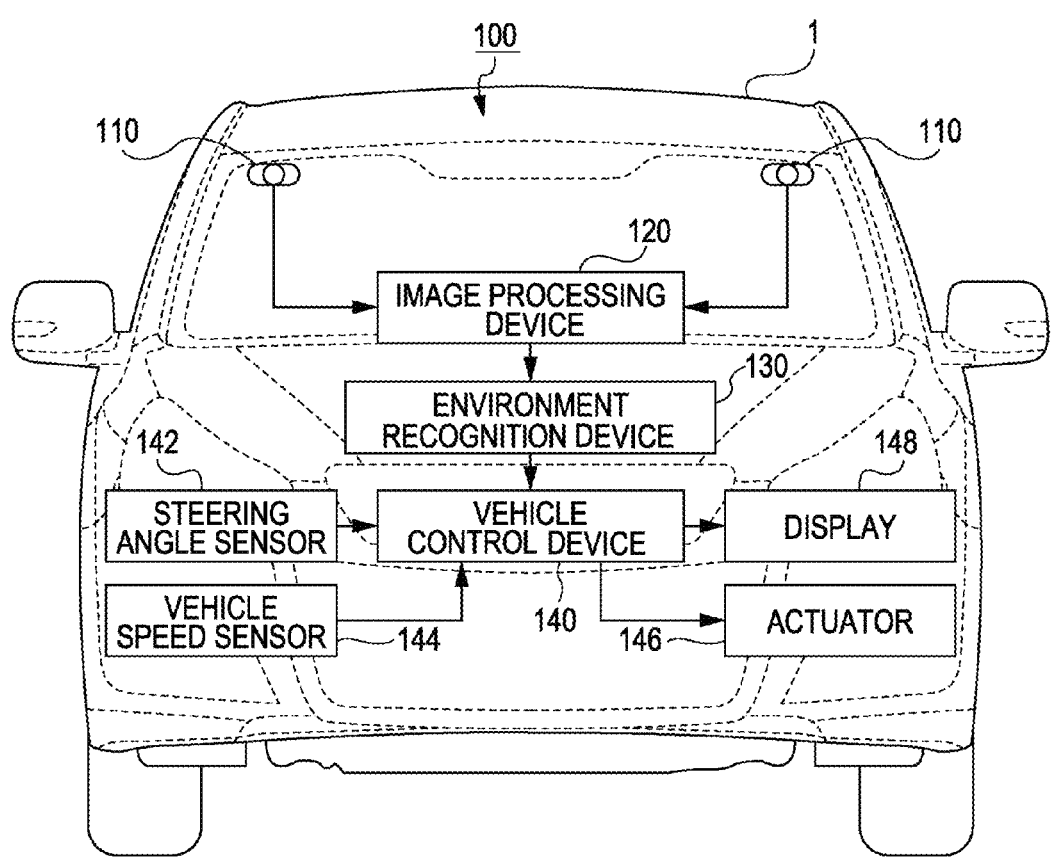
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes a plurality of image capturing devices 110 (two image capturing devices 110 in the present embodiment), an image processing device 120, an environment recognition device 130, and a vehicle control device 140 that are provided in a vehicle 1.

The image capturing devices 110 include an imaging element, such as a CCD (Charge-Coupled Device) and a CMOS (Complementary Metal-Oxide Semiconductor), and can obtain a color image, that is, a luminance composed of three color phases (red, green, blue) per pixel, through a front window. In the present embodiment, color and luminance are dealt in the same way; if both wordings are included in one sentence, both can be read as luminance configuring color, or color having luminance. In this case, a color image captured by the image capturing devices 110 is referred to as luminance image and is distinguished from a distance image to be explained later. The image capturing devices 110 are disposed to be spaced apart from each other in a substantially horizontal direction so that optical axes of the two image capturing devices 110 are substantially parallel in a proceeding direction of the vehicle 1. The image capturing devices 110 continuously generates image data obtained by capturing an image of a target object in a detection area in front of the vehicle 1 at every 1/60 seconds (60 fps), for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data.

The image processing device 120 obtains image data from each of the two image capturing devices 110, and derives, based on the two pieces of image data, parallax information including a parallax of any block (a set of a predetermined number of pixels) in the image and a position representing a position of the any block in the image. Specifically, the image processing device 120 derives a parallax using so-called pattern matching that searches a block in one of the image data corresponding to the block optionally extracted from the other image data. The block is, for example, an array including our pixels in the horizontal direction and four pixels in the vertical direction. In this embodiment, the horizontal direction means a horizontal direction for the captured image, and corresponds to the width direction in the real world. On the other hand, the vertical direction means a vertical direction for the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation.) adopting the degree of similarity of dispersion values obtained by subtracting a mean luminance value from a luminance value of each pixel. The image processing device 120 performs such parallax deriving processing on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived by the target object, but is independently derived by the resolution (for example, by the block) in the detection area. In this embodiment, an image obtained by associating the parallax information thus derived (corresponding to a later-described relative distance) with image data is referred to as a distance image.

Figure 2A:
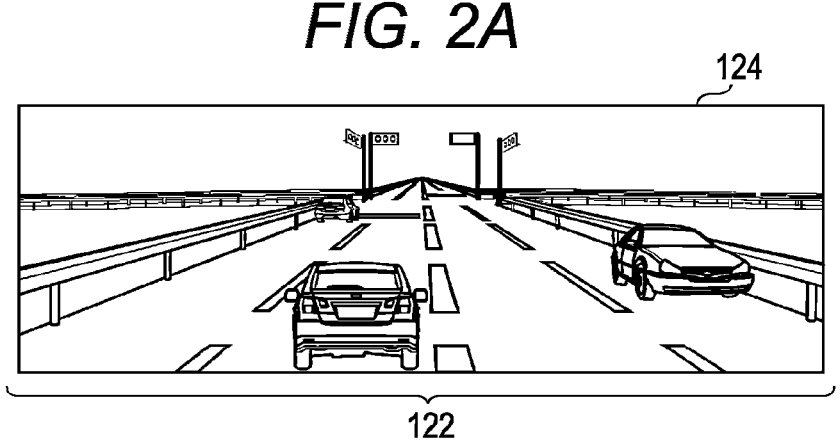
FIGS. 2A and 2B are explanatory diagrams for explaining a luminance image and a distance image.
Figure 2B:
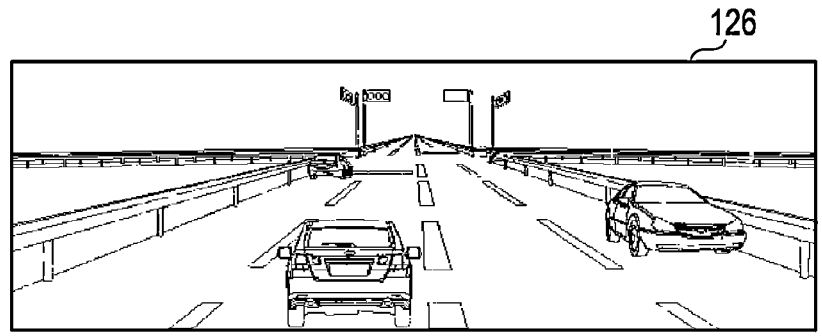

FIGS. 2A and 2B are explanatory diagrams for explaining a luminance image 124 and a distance image 126. For example, Assume that the luminance image (image data) 124 as shown in FIG. 2A is generated with regard to a detection area 122 by the two image capturing devices 110. Here, for the sake of easy understanding, only one of the two luminance images 124 is schematically shown. In the present embodiment, the image processing device 120 obtains a parallax for each block from such luminance image 124, and forms the distance image 126 as shown in FIG. 2B. Each block of the distance image 126 is associated with a parallax of the block. In the drawing, for the sake of explanation, a block from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 obtains the luminance image 124 and the distance image 126 from the image processing device 120, and uses the luminances based on the luminance image 124 and a relative distance from the subject vehicle 1 based on the distance image 126 to determine which specific object the target object in the detection area 122 corresponds to. In this embodiment, the environment recognition device 130 uses a so-called stereo method to convert the parallax information for each block in the detection area 122 of the distance image 126 into three-dimensional position information including a relative distance, thereby deriving heights. The stereo method is a method using a triangulation method to derive a relative distance of a target object with respect to the image capturing devices 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting an angle of the steering and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally implemented with the environment recognition device 130.

(Environment Recognition Device 130)

Figure 3:
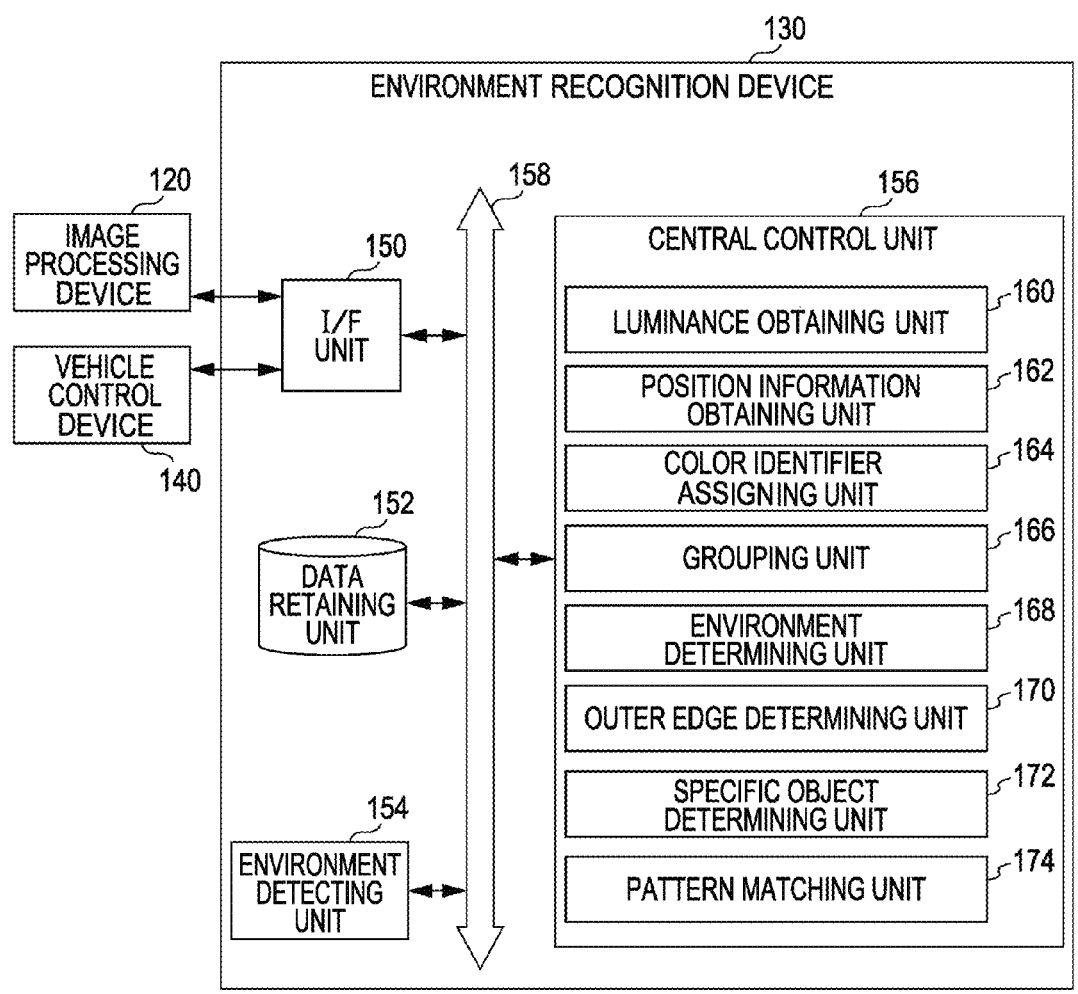
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 an I/F unit 150, a data retaining unit 152, an environment detecting unit 154, and a central control unit 156.

The I/F unit 150 is an interface for interactive information exchange with the image processing device 120 and the vehicle control device 140. The data retaining unit 152 is constituted by a RAM, a flash memory, an HDD and the like, and retains a color table (association), a specific object table (association) and various kinds of information required for processing performed by each functional unit explained below. In addition, the data retaining unit 152 temporarily retains the luminance image 124 and the distance image 126 received from the image processing device 120. The specific object table is used as follows.

FIG. 4 is an explanatory diagram for explaining a color table 190. In the color table 190, a luminance range 192 indicating a predetermined number of colors defined in advance is associated with a color identifier 194. For example, the luminance range 192 corresponding to light red is associated with a color identifier "1", the luminance range 192 corresponding to yellow is associated with a color identifier "2", the luminance range 192 corresponding to light blue-green is associated with a color identifier "3", the luminance range 192 corresponding to red relatively darker than the color identifier "1" is associated with a color identifier "4", the luminance range 192 corresponding to red relatively darker than the color identifier "4" is associated with a color identifier "5", the luminance range 192 corresponding to yellow relatively darker than the color identifier "2" is associated with a color identifier "6", the luminance range 192 corresponding to blue-green relatively darker than the color identifier "3" is associated with a color identifier "7", and the luminance range 192 corresponding to blue-green relatively darker than the color identifier "7" is associated with a color identifier "8". However, it is to be understood that the luminance ranges are not limited to the luminance ranges described in FIG. 4, and the number of luminance ranges is not limited thereto.

FIG. 5 is an explanatory diagram for explaining a specific object table 200. In the specific object table 200, each specific object is associated with a representing color identifier 194a corresponding to a luminance range of the specific object, one or more color identifiers 194 including a range similar to the luminance of the specific object (in the present embodiment, sub color identifier 194b), and a width range 202 indicating a range of size of the specific object. The specific objects include various objects required to be observed while the vehicle runs on the road, such as "traffic light (red)", "traffic light (yellow)", "traffic light (blue)", "tail lamp (red)", "turn signal (orange)", "road sign (yellow)", "road sign (blue)", and "road sign (green)". It is to be understood that the specific object is not limited to the objects in FIG. 5. The specific object table 200 defines the order of priority for specifying a specific object, and the environment recognition processing is performed in accordance with the order of priority for each specific object sequentially selected from the plurality of specific objects in the specific object table 200. Among the specific objects, for example, a specific object "traffic light (red)" is associated with one or more color identifiers of "1" and "4".

The representing color identifier 194a is any one of the one or more color identifiers 194, and a color identifier 194 corresponding to the luminance most suitable for specifying the specific object is defined as the representing color identifier 194a. The sub color identifier 194b is assigned the color identifier 194 corresponding to the luminance suitable for specifying a target portion of an area where light emitted from a specific object is diffused, in an environment where light is likely to be diffused, such as in rainy, in snow, in hailstones, and in fog.

A later-described environment determining unit 168 associates a representing color identifier 194a with a detection result that indicates that a detection area is in the environment where light is diffused, while associating a representing color identifier 194a and a sub color identifier 194b with a detection result that indicates that the detection area is not in the environment where light is diffused. A lower luminance range is set for the sub color identifier 194b, compared to the representing color identifier 194a. This is because there may be the case in which the range for specifying the specific object cannot appropriately be detected only by the representing color identifier 194a.

In the present embodiment, based on the specific object table 200, any target portion in the luminance image 124 that satisfies the condition of the multiple color identifiers 194 (luminance range 192) with regard to any specific object is adopted as a candidate for the specific object. For example, when the luminance of a target portion are included in the luminance range 192 of the specific object "traffic light (red)" based on the multiple color identifiers 194, the target portion is adopted as a candidate for the specific object "traffic light (red)". Then, when the target object made by grouping the target portions is extracted in a form which appears to be a specific object, for example, when the size of a grouped target object is included in the width range "0.2 to 0.4 m" of the "traffic light (red)", it is determined to be the specific object. The target portion determined to be the specific object is labeled with a color identifier (identification number) unique to the specific object. A Pixel or a block made by collecting pixels may be used as the target portion. Hereafter, in the present embodiment a pixel is used the target portion for the sake of convenience of explanation.

The environment detecting unit 154 includes, for example, a rain detecting unit that detects rainfall, and a snow detecting unit that detects snowfall. When detecting rainfall or snowfall, the environment detecting unit 154 outputs detection information indicating the detection of rainfall or the detection of snowfall to the environment determining unit 168. The environment detecting unit 154 may output an amount of rainfall or an amount of snowfall to the environment determining unit 168, in addition to the detection as to whether there is rainfall or snowfall. The environment detecting unit 154 may detect not only rainfall or snowfall but also an environment where light from a target object such as a traffic light in a captured image is diffused, for example, an environment were the image capturing device 110 captures a backlit image.

The rain detecting unit includes, for example, a light-emitting device that emits infrared ray, a prism that directs the infrared ray to a front window, and a light-receiving device that outputs a value according to the intensity of the received light that is the infrared ray reflected on the front window. When water droplets are deposited onto the front window, the infrared ray irradiated to the portion where there are water droplets is not reflected toward the light device, so that the output value of the light-receiving device is reduced. When the output value is not more than a predetermined threshold value, the rain detecting unit detects this situation as rainfall. The rain detecting unit can be realized by any other existing techniques. The snow detecting unit can also be realized by various existing techniques. Therefore, the detailed description such as its configuration will be omitted here.

The central control unit 156 is comprised of a semiconductor integrated circuit including, for example, a central processing unit (CPU), a ROM storing a program and the like, and a RAM serving as a work area, and controls the I/F unit 150, the data retaining unit 152 and the environment detecting unit 154 through a system bus 158. In the present embodiment, the central control unit 156 also functions as a luminance obtaining unit 160, a position information obtaining unit 162, a color identifier assigning unit 164, a grouping unit 166, an environment determining unit 166, an outer edge determining unit 170, a specific object determining unit 172, and a pattern matching unit 174.

The luminance obtaining unit 160 obtains a luminance by the target portion (pixel) (a luminance composed of three color phases (red, green, and blue) per pixel) from the received luminance image 124 according to a control instruction of the color identifier assigning unit 164 explained later. At this time, when it is, for example, rainy or cloudy in the detection area 122, the luminance obtaining unit 160 may obtain the luminances after adjusting a white balance so as to obtain the original luminances.

The position information obtaining unit 162 uses the stereo method to convert parallax information for each block in the detection area 122 of the distance image 126 into three-dimensional position information including a horizontal distance in the width direction x, a height distance in the height direction y from a road surface, and a relative distance in the death direction z from the subject vehicle 1 according to a control instruction of the grouping unit 166 explained later.

The parallax information represents a parallax of each target portion in the distance image 126, whereas the three-dimensional position information represents information about the relative distance of each target portion in the real world. Accordingly, a term such as width, height and relative distance refers to a distance in the real world, whereas a term such as a detected distance refers to a distance in the distance image 126. When the parallax information is not derived by the pixel but is derived by the block, that is, a calculation may be executed in units of pixels with the parallax information being deemed as parallax information about all the pixels which belong to a block.

Figure 6:
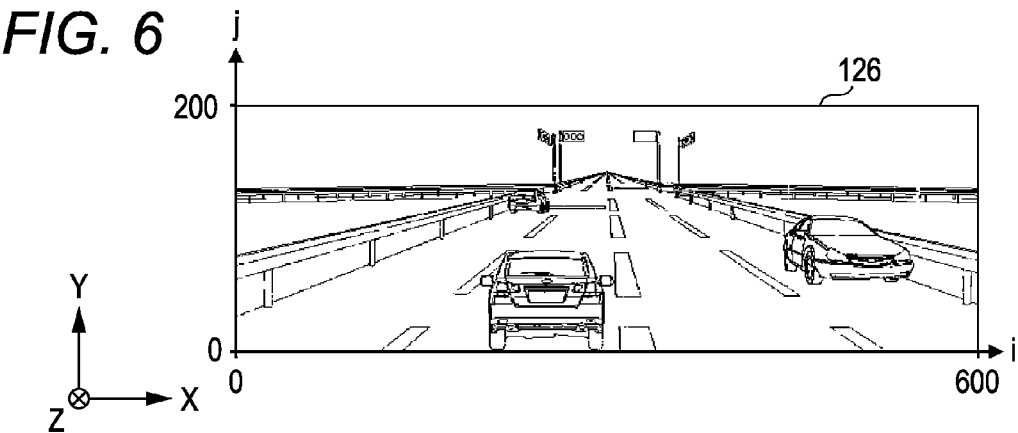
FIG. 6 an explanatory diagram for explaining conversion into three-dimensional position information performed by a position information obtaining unit.

FIG. 6 is an explanatory diagram for explaining conversion into three-dimensional position information by the position information obtaining unit 162. First, the position information obtaining unit 162 treats the distance image 126 as a coordinate system in a pixel unit as shown in FIG. 6. In FIG. 6, the lower left corner is adopted as an origin (0, 0). The horizontal direction is adopted as an i coordinate axis, and the vertical direction is adopted as a j coordinate axis Therefore, a pixel having a parallax dp can be represented as (i, j, dp) using a pixel position i, j and the parallax dp.

The three-dimensional coordinate system in the real world according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two imaging devices 110 is denoted as an origin (0, 0, 0). When the road is assumed to be a flat plane, the road surface matches the X-Z plane (y=0). The position information obtaining unit 162 uses (formula 1) to (formula 3) shown below to transform the coordinate of the pixel (i, j, dp) in the distance image 126 into a three-dimensional point (x, y, z) in the real world.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the imaging devices 110, PW denotes a corresponding distance in the real world to a distance between adjacent pixels in the image, so-called like an angle of view per pixel, CH denotes an disposed height of the imaging device 110 from the road surface, IV and JV denote coordinates (pixel) in the image at an infinity point in front of the vehicle 1, and KS denotes a distance coefficient (KS=CD/PW).

The color identifier assigning unit 164 assigns the color identifier to the target portion according to the luminance of the target portion on the basis of the color table 190 retained in the data retaining unit 152.

More specifically, the color identifier assigning unit 164 causes the luminance obtaining unit 160 to obtain the luminance of any given target portion in the luminance image 124. Subsequently, the color identifier assigning unit 164 sequentially selects any color identifier 194 registered in the color table 190, and determines whether the obtained luminance of the target portion is included in the luminance range 192 of the color identifier 194 sequentially selected. Then, when the luminance is determined to be in the luminance range 192 under examination, the color identifier is assigned to the target portion so that a color identifier map is generated.

The color identifier assigning unit 164 sequentially executes a series of comparisons between the luminance of the target portion and the luminance ranges 192 of the multiple color identifiers 194 registered in the color table 190. The order selecting the color identifiers 194 in the color table 190 as explained above also shows the order of priority. That is, in the example of the color table 190 of FIG. 4, the comparison processing is executed in the following order: "light red", "yellow", "light blue-green", "red", "dark red", "dark yellow", "blue-green", and "dark blue-green".

When the comparison is performed according to the above order of priority, and as a result, the luminance of the target portion is determined to be included in the luminance range 92 of a color identifier 294 of a high order of priority, the comparison processing is no longer performed for specific objects of a lower order of priority. Therefore, only one color identifier 194 is assigned. This is because a plurality of specific objects do not overlap in the real world, and thus a target object that is once assigned any given color identifier 194 by the color identifier assigning unit 164 is no longer assigned another color identifier 194. By exclusively treating the target portions in this manner, it is possible to avoid redundant specifying processing for the same target portion that is already assigned a color identifier 194, and the processing load can be reduced.

Figure 7:
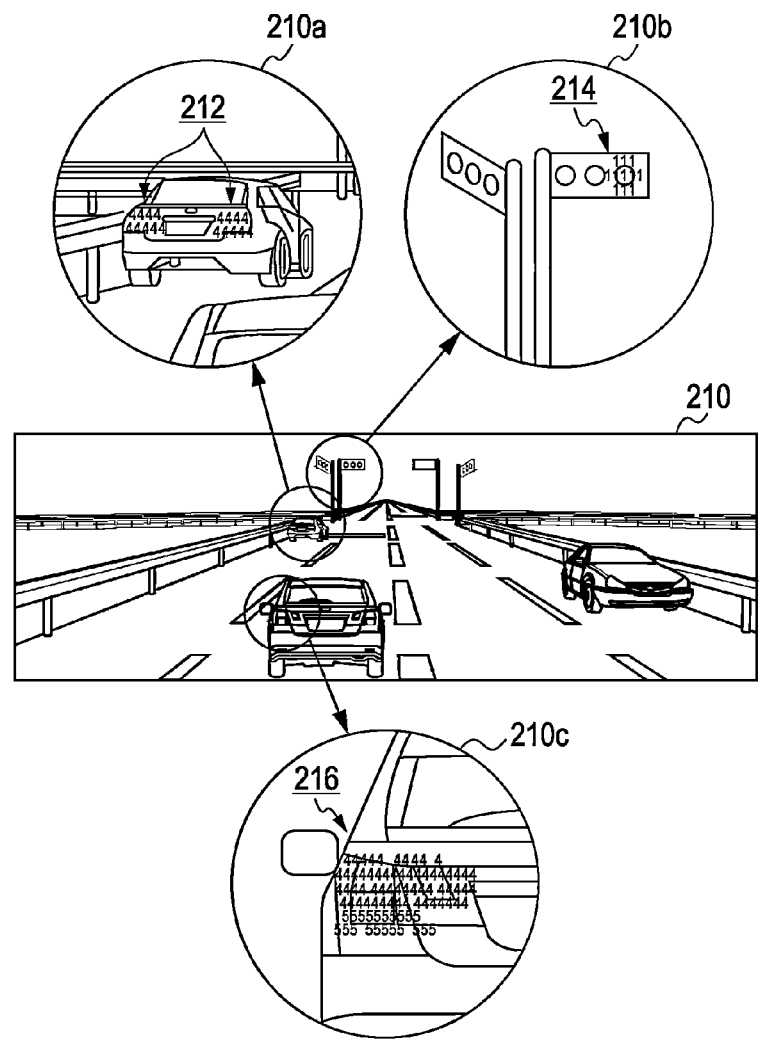
FIG. 7 is an explanatory diagram for explaining a color identifier map.

FIG. 7 is an explanatory diagram for explaining a color identifier map 210. The color identifier map 210 is made by overlaying the color identifiers 194 on the luminance image 124. Therefore, the color identifiers 194 are assigned in a gathered manner to a position corresponding to a specific object that is expected to have the luminances within the luminance range 192 of a color identifier 194.

For example, in a segment 210a of the color identifier map 210, the luminances of target portions 212 corresponding to the tail lamps of the preceding vehicle are compared with the luminance range 192 of each of the color identifiers "1", "2", "3", and "4" in order. As a result, the luminances of target portions 212 are included in luminance range 192 of the color identifier "4", and therefore, the color identifier "4" of the specific objects "tail lamp (red) is assigned. In a segment 210b of the color identifier map 210, the luminances of target portions 214 corresponding to the light-emitting portions at the right side of the traffic light are included in the luminance range 192 of the color identifier "1", and therefore, the color identifier "1" of the specific object "traffic light (red)" is assigned. Further, in a segment 210c of the color identifier map 210, the luminances of target portions 216 corresponding to the back surface lamp portion of the preceding vehicle are compared with the luminance ranges 192 of the color identifiers "1", "2", and "3" in order, and finally, the color identifier "4" of the specific object "tail lamp (red)" and the color identifier "5" of the specific object "turn signal (orange)" are assigned. FIG. 7 shows a figure in which color identifiers are assigned to target portions of the luminance image 124. This is, however, a conceptual representation for the sake of easy understanding. In reality, color identifiers are registered as data at the target portions.

The grouping unit 166 adopts any given target portion as a base point, and groups target portions corresponding to a same specific object of which position differences in the width direction x and in the height direction y are within a predetermined range (for example, 1.0 m), thereby making the grouped target portions into a target object. The predetermined range is represented as a distance in the real world, and can be set at any given value.

More specifically, first, the grouping unit 166 successively obtains the color identifier 194 of any given target portion in the luminance image 124. Then, the grouping unit 166 adopts the target portion as a base point, and groups another target portion, between whose position and the base point differences in the width direction x and the height direction y are within a predetermined range and which satisfies a condition, into a target object. The condition is defined such that the another target portion is assigned one of color identifiers 194 (in the present embodiment, representing color identifier 194a and sub color identifier 194b) associated with a specific object having the color identifier 194 of the base point as the representing color identifier 194a.

The grouping unit 166 also adopts the target portion newly added through the grouping processing as a base point and groups another target portion, of which position differences in the width direction x and in the height direction y are within a predetermined range and which is assigned the representing color identifier 194a or the sub color identifier 194b associated with the same specific object as the base point. Consequently, as far as the distances between the target portions which are assigned the representing color identifier 194a or the sub color identifier 194b associated with the same specific object is within the predetermined range, all of such target portions are grouped.

In this case, the grouping unit 166 makes the determination using the distances in the with direction x and the distance in the height direction y in the real world, but when a determination is made using the detection distances in the luminance image 124 and the distance image 126, the threshold value of the predetermined range for grouping is changed according to the relative distance in the depth direction z of the target portion. As shown in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the grouping processing can be stably performed.

In the above description, each of the difference in the width direction x and the difference in the height direction y is independently determined, and only when both of them are included within the predetermined range, the target portions are grouped into the same group. However, grouping processing maybe performed using another calculation. For example, when Euclidean distance, square root of ((difference in the width direction x)$^2$+(difference in the height direction y)$^2$), is included within a predetermined range, target portions may be grouped into the same group. With such calculation, distances between target portions in the real world can be derived accurately, and therefore, grouping accuracy can be enhanced.

Figure 8A:
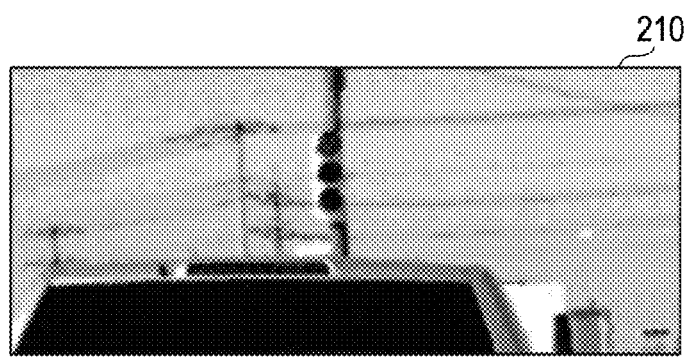
FIGS. 8A and 8B are explanatory diagrams for explaining processing of a grouping unit.
Figure 8B:
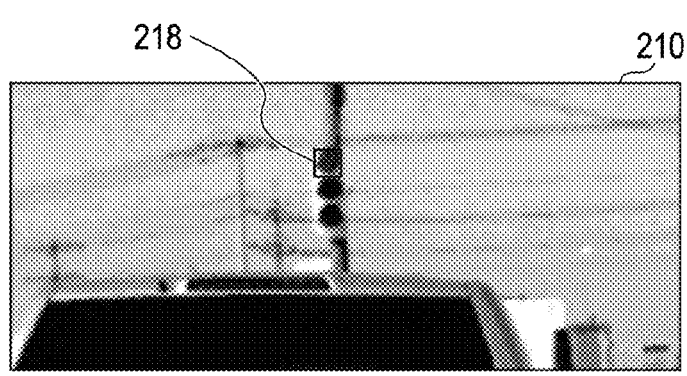

FIGS. 8A to 8D are explanatory diagrams for explaining processing of the grouping unit 166. In the drawings, color identifiers 194 are omitted for the purpose of easy understanding. For example, with respect to the color identifier map 210 illustrated in FIG. 8A, the grouping unit 166 groups all target portions within the predetermined range that are assigned the representing color identifier 194a or the sub color identifier 194b associated with the specific object "traffic light (red)", and produces a target object 218 as illustrated in FIG. 8B Thus, the specific object of "traffic light (red)" is extracted.

The environment determining unit 168 determines whether or not the detection area 122 is in the environment where light is diffused. The environment where light is diffused is generated by water droplets onto a front window due to rainfall or snowfall, streak caused by cleaning the water droplets, or the like. When the detection information output from the environment detecting unit 154 indicates that there is rainfall or snowfall, the environment determining unit 168 determines that the detection area 122 is in the environment where light is diffused.

Figure 9A:
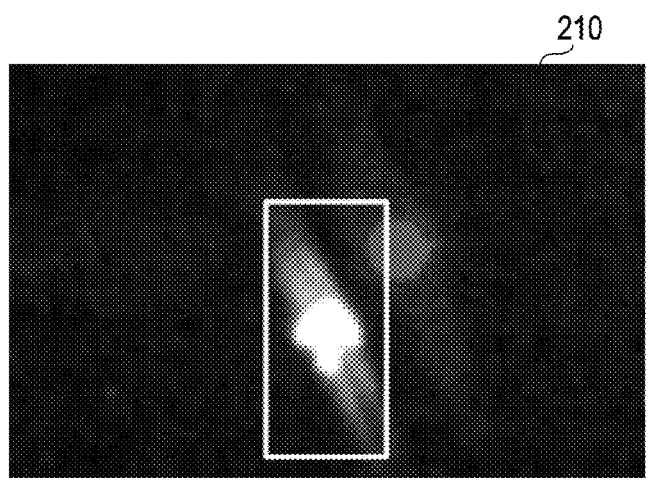
FIGS. 9A to 9C are explanatory diagrams for explaining processing of an outer edge determining unit.
Figure 9B:
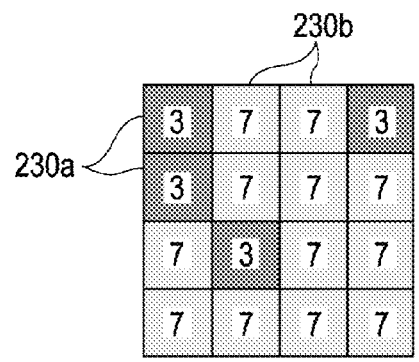
Figure 9C:
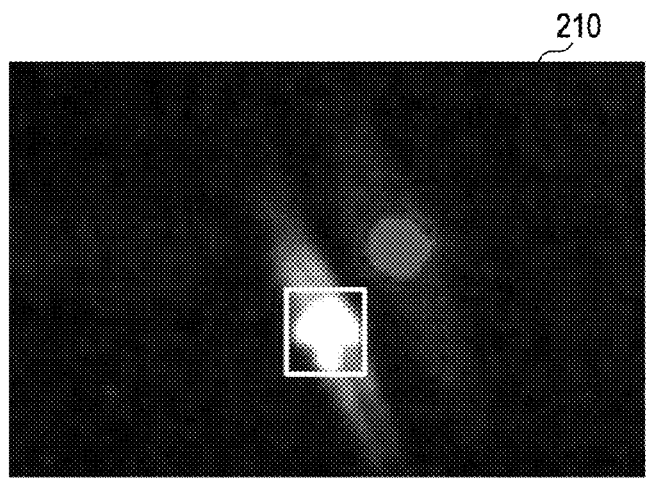

FIGS. 9A to 9C are explanatory diagrams for explaining processing of the outer edge determining unit 170. For easy understanding, the color identifier 194 is not illustrated in the figure. After the target portions are grouped as a target object by the grouping unit 166, the outer edge of the target object is defined as a rectangle shape in order to facilitate the data processing. Specifically, from the target portions forming the target object, the outer edge determining unit 170 extracts a target portion whose position in the width direction x is the leftmost (xl), a target portion whose position in the width direction x is the rightmost (xr), a target portion whose position in the height direction y is the minimum (ymin), and a target portion whose position in the height direction y is the maximum (ymax). Then, it defines a rectangle enclosed by the 4 straight lines of x=xl, x=xr, y=ymin, and y=ymax as an outer edge of the target object.

However, as illustrated in FIG. 9A, light from the light source of the traffic light spreads (runs) in any direction to be diffused on the color identifier map 210 of the traffic light captured on a rainy day. When a rectangle region indicated by a white frame is set as the outer edge of the target object, a range larger than the real light source might be determined as the outer edge of the target object.

As described above, target portions corresponding to diffused light deteriorate the accuracy of specifying a specific object. Therefore, it is desirable to exclude these portions from a target object. However, the luminance range corresponding to the diffused light is effectively utilized for specifying the contour of a traffic light when the weather is fine. Therefore, excluding the target portions belonging to the luminance range of diffused light without any exception might deteriorate the accuracy of specifying a specific object on a clear day.

In view of this, the outer edge determining unit 170 selects the color identifier 194 according to whether or not the target object is in an environment where light is diffused, and defines a outer edge specified by the target portions to which the selected color identifier 194 is assigned, as the outer edge of the target object. In the present embodiment, the selected color identifier is the representing color identifier 194a or the sub color identifier 194b. However, a plurality of color identifiers may be combined.

FIG. 9B schematically illustrates target portions 230a and 230b forming a target object. The representing color identifier 194a is assigned to the target portion 230a, while the sub color identifier 194b is assigned to the target portion 230b.

From the target portions 230a to which the representative color identifier 194a is assigned, the outer edge determining unit 170 extracts the target portion whose position in the width direction x is the leftmost (xl), the target portion whose position in the width direction x is the rightmost (xr), the target portion whose position in the height direction y is the minimum (ymin), and the target portion whose position in the height direction y is the maximum (ymax). The outer edge determining unit 170 retains the coordinates of the target portions in the data retaining unit 152.

From the target portions 230b to which the sub color identifier 194b is assigned, the outer edge determining unit 170 also extracts the target portion whose position in the width direction x is the leftmost (xl), the target portion whose position in the width direction x is the rightmost (xr), the target portion whose position in the height direction y is the minimum (ymin), and the target portion whose position in the height direction y is the maximum (ymax). The outer edge determining unit 170 retains the coordinates of the target portions in the data retaining unit 152.

When the environment determining unit 168 determines that the target object is in the environment where light is diffused, the outer edge determining unit 170 then encloses the target portions by the rectangular region enclosed by 4 straight lines of x=xl, x=xr, y=ymin, and y=ymax by using the coordinates of the target portions 230a to which the representing color identifier 194a is assigned. Accordingly, as shown in FIG. 9B, four target portions 230b, to which the sub color identifier 194b is assigned, on the lowermost row are excluded, so that the outer edge is defined so as to enclose the remaining twelve target portions 230a and 230b.

As described above, a lower luminance range is set for the sub color identifier 194b, compared to the representing color identifier 194a. Therefore, as indicated by a white frame in FIG. 9C, the outer edge determining unit 170 excludes the influence of the light, which has relatively low luminances and which diagonally spreads and diffuses, and determines the outer edge based on the target portions having relatively high luminances As described above, the environment recognition device 130 according to the present embodiment assigns the representing color identifier 194a, which is used for specifying a light source portion without being affected by the diffusion, to a specific object. Accordingly, even if the light of the light source of the traffic light is diffused due to rainy weather, the outer edge determining unit 170 can determine the outer edge of the target object so as to appropriately enclose the light source based on the representing color identifier 194a by excluding the influence of the diffused light. This process can enhance the accuracy in the following processings such as the pattern matching.

The configuration could be set such that, when the environment determining unit 168 determines that the target object is in the environment where light is diffused, the target portions are grouped based on only the representing color identifier 194a from the beginning to form the target object. However, on a rainy day, for example, water droplets are not necessarily deposited uniformly on the front window. Further, the degree of dispersion of droplets caused by turning on a windshield wiper is not uniform. Therefore, the degree of light diffusion is different depending upon a situation. If the target portions are to be grouped only by the representing color identifier 194a from the beginning, the target portions corresponding to the traffic light might not be grouped as one target object. In the present embodiment, the grouping unit 166 temporarily groups the target portions by the representing color identifier 194a and the sub color identifier 194b, and then, the outer edge determining unit 170 determines the outer edge. This configuration can avoid this problem.

In the present embodiment, the color representing identifier et 194a and the sub color identifier 194b are associated with the result of the detection as to whether the target object is in the environment where light, is diffused. However, the environment determining unit 168 may obtain detection information indicating an amount of rainfall or an amount of snowfall, and may determine the light diffusion condition in a stepwise manner based on the detection information. In this case, the data retaining unit 152 associates a combination of one or more color identifiers 194 selected from the plurality of color identifiers 194 with each level of the light diffusion condition, and retains the association. The outer edge determining unit 170 selects a combination according to the light diffusion condition.

Specifically, it is assumed that rainfall is classified into heavy rainfall, normal rainfall, and light rainfall, in a stepwise manner according to the amount of rainfall. It is also assumed that the range of an output value (detection information) from the light-receiving device of the rain detecting unit is set beforehand in association with the classification of rainfall. The environment determining unit 168 specifies the classification of the rainfall corresponding to the output value, and outputs the resultant to the outer edge determining unit 170. In the present embodiment, the light diffusion is considered to be large, as the amount of rainfall is large. The outer edge determining unit 170 selects the combination of the color identifiers 194 determined in a stepwise manner according to the light diffusion condition (heavy rainfall, normal rainfall, or light rainfall), and determines the outer edge based on the selected combination of the color identifiers 194.

As described above, the outer edge determining unit 170 uses the plurality of combinations of the color identifiers 194 according to the light diffusion condition that is set in a stepwise manner, thereby determining the outer edge of the target object by using the luminance range 192 more suitable for the environment based on the amount of rainfall or the amount of snowfall.

As described above, the light, diffusion on the luminance image 124 is caused by rainfall or snowfall. Since the environment recognition device 130 includes the rainfall detecting unit or the snowfall detecting unit, it can correctly specify the light diffusion condition based on the rainfall or snowfall, and can determine an outer edge of a target object with an appropriate size.

As a result, the environment recognition device 130 can extract, from the luminance image 124, one or more target objects as specific objects, and the information can be used for various kinds of control. For example, when the specific object "traffic light (red)" is extracted, this indicates that the target object is a fixed object that does not move, and when the target object is a traffic light for the subject vehicle, this indicates that the subject vehicle 1 has to stop or decelerate. When the specific object "tail lamp (red)" is extracted, this indicates that there is a preceding vehicle travelling together with the subject vehicle I and that the back surface of the preceding vehicle is at the relative distance in the depth direction z of the specific object "tail lamp (red)".

When a target object made as a result of grouping processing by the grouping unit 166 satisfies a predetermined condition, the specific object determining unit 172 determines that the target object is a specific object. For example, as shown in FIG. 5, when the width range 202 is given in the specific object table 200, and the size (both the distance in the width direction x and the distance in the height direction y) of a target object is included in the width range 202 the representing color identifier 194a of the specific object on the basis of the specific object table 200, the specific object determining unit 168 determines the target object as the specific object. A separate width range 202 may be set for each of the distance in the width direction x and the distance in the height direction y. Here, it is examined whether the target object is of a size adequate to be deemed as a specific object. Therefore, when the size of the target object is not included in the width range 202, the target object can be excluded as information unnecessary for the environment recognition processing. For example, in the example shown in FIGS. 8A to 8D, the size of the target object 218 of FIG. 8B is included in the width range "0.2 to 0.4 m" of the specific object "traffic light (red)", and thus the target object 218 is appropriately specified as the specific object "traffic light (red)".

As a result, the environment recognition device 130 can extract, from the luminance image 124, one or more target objects as specific objects, and the information can be used for various kinds of control. For example, when the specific object "traffic light (red)" is extracted, this indicates that the target object is a fixed object that does not move, and when the target object is a traffic light for the subject vehicle, this indicates that the subject vehicle 1 has to stop or decelerate. When the specific object. "tail lamp (red)" is extracted, this indicates that there is a preceding vehicle travelling together with the subject vehicle 1 and that the back surface of the preceding vehicle is at the relative distance in the depth direction z of the specific object "tail lamp (red)".

Since a plurality of specific objects do not overlap in the real world, a target object that is once determined to be any given specific object is no longer determined to be another specific object. Therefore, the grouping unit 166 performs the grouping process by excluding target portions that form a target object and are already determined as a specific object by the specific object determining unit 172. Specifically, when, upon the specific object determining processing for one selected specific object, target portions are determined as the selected specific object, the target portions are not used for the grouping processing for another specific object. Since the target region is handled exclusively, a redundant grouping process of the target region, which has already been determined to be a specific object, can be avoided, whereby the processing load can be reduced.

When a specific object determined by the specific object determining unit 174 is, for example, a "sign" and it is assumed that the specific object indicates a speed limit, the pattern matching unit 172 further executes pattern matching for a numerical value indicated therein, and specifies the numerical value. In this manner, the environment recognition device 130 can recognize the speed limit, and the like of the traffic lane in which the subject vehicle is travelling.

In the present embodiment, the specific object determining unit 174 first extracts a plurality of limited specific objects, and then only has to perform the pattern matching only on the extracted specific objects. Therefore, in contrast to the conventional case where pattern matching is performed on the entire surface of the luminance image 124, the processing load is significantly reduced.

(Environment Recognition Method)

Hereinafter, the particular processings performed by the environment recognition device 130 will be explained based on the flowchart shown in FIGS. 10 to 14. FIG. 10 illustrates an overall flow of interrupt processing when the image processing device 120 transmits the distance image (parallax information) 126. FIGS. 11 to 14 illustrate subroutines therein. In this description, pixels are used as target portions, and the lower left corners of the luminance image 124 and the distance image 126 are origins. The processing is performed according to the environment recognition method in a range of 1 to 600 pixels in the horizontal direction of the image and 1 to 200 pixels in the vertical direction of the image. In this description, the numbers of the color identifiers 194 and specific objects to be checked are assumed to be eight.

As shown in FIG. 10, when an interrupt occurs according to the environment recognition method in response to reception of the distance image 126, the luminance image 124 obtained from the image processing device 120 is referred to, and a color identifier 194 is assigned to a target portion, whereby a color identifier map 210 is generated (S300).

Subsequently, the target portions, of which positions differences are close and of which color identifiers satisfy the condition in the color identifier map 210 are grouped into a target object (S302), and the outer edge determining processing is performed (S304), and the target object is determined to be a specific object (S306). If it is necessary to further obtain information from the specific object thus determined, the pattern matching unit 170 executes the pattern matching on the specific object (S308). Then, the interruption processing is terminated.

(Color Identifier Map Generating Processing S300)

Figure 11:
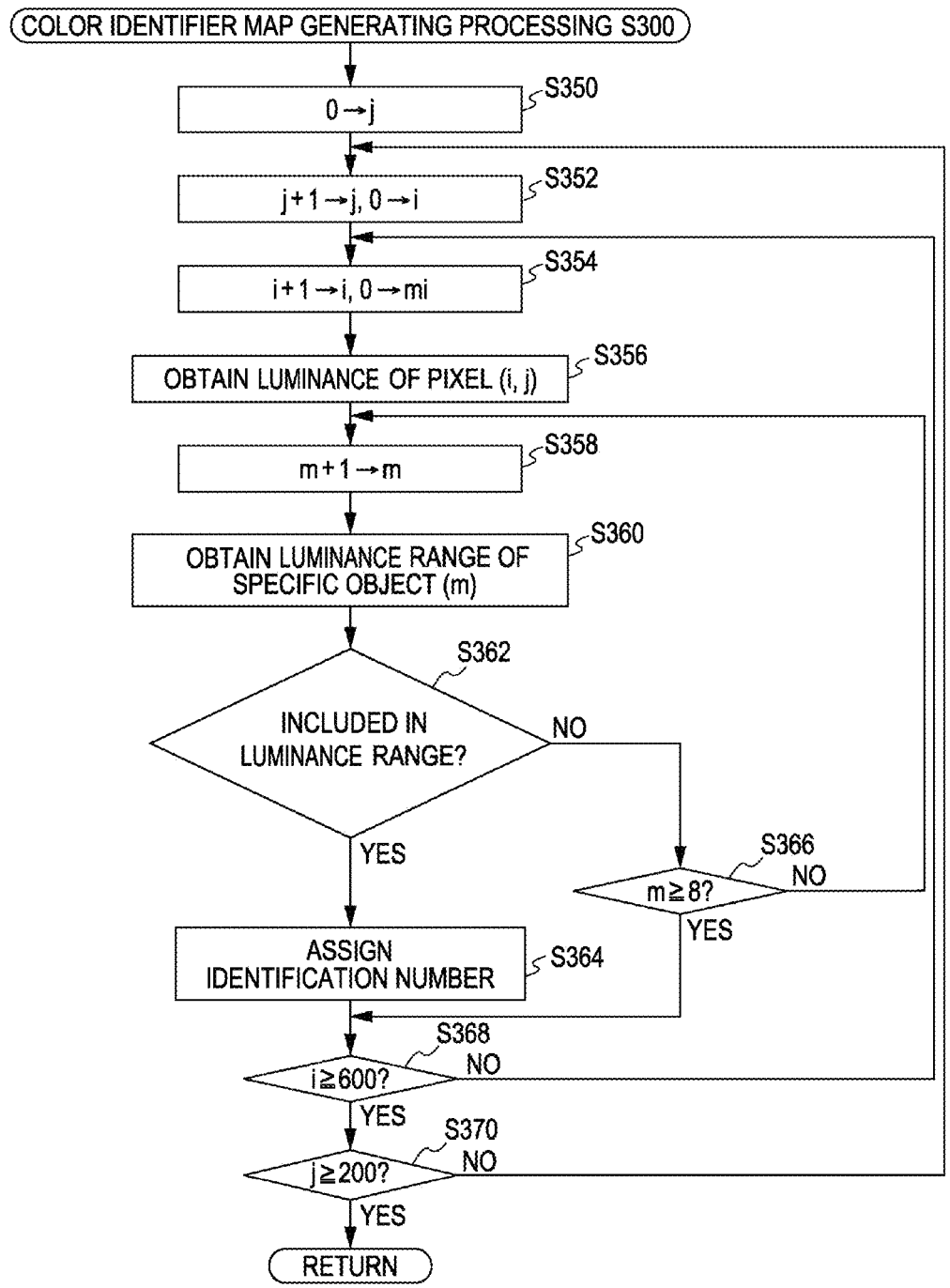
FIG. 11 is a flowchart illustrating a flow of color identifier map generating processing.

As shown in FIG. 11, the specific object provisional determining unit 164 initializes (substitutes "0" to) a vertical variable j for specifying a target portion (pixel) (S350). Subsequently, the specific object provisional determining unit 164 adds "1" to (increments by 1) the vertical variable j, and initializes (substitutes "0" to) a horizontal variable i (S352). Then, the specific object provisional determining unit 164 adds "1" to the horizontal variable i, and initializes a specific object variable m (S354). Here, the horizontal variable i and the vertical variable j are provided to execute the specific object map generating processing on all of the 600×200 pixels, and the specific object variable m is provided to sequentially compare eight specific objects for each pixel.

The color identifier assigning unit 164 causes the luminance obtaining unit 160 to obtain a luminance of a pixel (i, j) as a target portion from the luminance image 124 (S356), adds "1" to the specific object variable m (S358), obtains the luminance range 192 of the representing color identifier of the specific object (m) (S360), and determines, whether or not the luminance of the pixel (i, j) are included in the luminance range 192 of the representing color identifier of the specific object (m) (S362).

When the luminance of the pixel (i, j) are included in the luminance range 192 of the representing color identifier of the specific object (m) (YES in S362), the color identifier assigning unit 164 assigns a color identifier p to the target portion so as to be expressed a pixel (i, j, p) (S364). When the luminance of the pixel (i, j) are not included in the luminance range 192 of the representing color identifier of the specific object (m) (NO in S362), a determination is made as to whether or not the specific object variable m is equal to or more than 8 which is the maximum number of specific objects (S366). When the specific object variable m is less than the maximum value (NO in S366), the processings are repeated from the increment processing of the specific object variable m in step S358. When the specific object variable m is equal to or more than the maximum value (YES in S366), which means that there is no specific object corresponding to the pixel (i, j), the processing in step S368 subsequent thereto is performed.

Then, the color identifier assigning unit 164 determines whether or not the horizontal variable i is equal to or more than 600 which is the maximum value of pixel number in the horizontal direction (S368), and when the horizontal variable i is less than the maximum value (NO in S368), the processings are repeated from the increment processing of the horizontal variable i in step S354. When the horizontal variable i is equal to or more than the maximum value (YES in 3368), the color identifier assigning unit 164 determines whether or not the vertical variable j is equal to or more than 200 which is the maximum value of pixel number in the vertical direction (S370). Then, when the vertical variable j is less than the maximum value (NO in S370), the processings are repeated from the increment processing of the vertical variable j in step S352. When the vertical variable j is equal to or more than the maximum value (YES in S370), the color identifier map generating processing is terminated.

(Grouping Processing S302)

Figure 12:
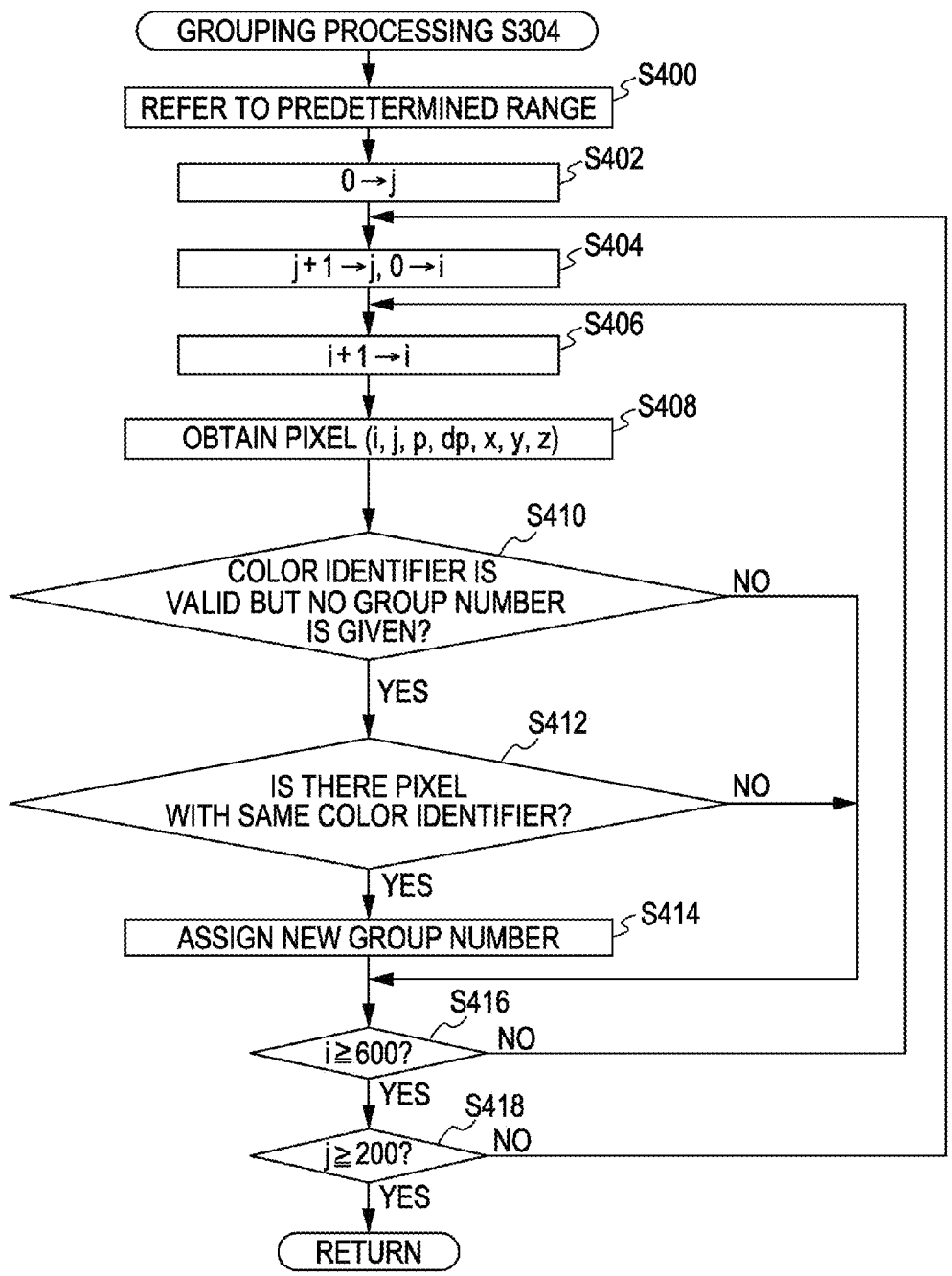
FIG. 12 is a flowchart illustrating a flow of grouping processing.

As shown in FIG. 12, the grouping unit 166 refers to the predetermined range to group target portions (S400), and initializes (substitutes "0" to) the vertical variable j for specifying a target portion (pixel) (S402). Subsequently, the grouping unit 166 adds "1" to the vertical variable j, and initializes (substitutes "0" to) the horizontal variable i (S404). Then, the grouping unit 166 adds "1" to the horizontal variable i (S406).

The grouping unit 166 obtains a pixel (i, j, p, dp) including the parallax information dp as the target portion from the luminance image 124 and transforms the coordinate of the pixel (i, j, p, dp) including the parallax information dp into a point (x, y, z) in the real world so as to be expressed as a pixel (i, j, p, dp, x, y, z) (S408). Then, a determination is made as to whether the pixel (i, j, p, dp, x, y, z) has a valid (not zero) color identifier p and a group number g is not yet given thereto (S410). When there is a valid color identifier p and a group number g is not yet given (YES in S410), the grouping unit 166 determines whether or not, within a predetermined range from the coordinate position (x, y, z) of the pixel in the real world, there is another pixel which is assigned a representing color identifier 194a or a sub color identifier associated with a specific object of which representing color identifier 194a is the color identifier p and which is not yet given a group number g (S412).

If there is another pixel (i, j, p, dp, x, y, z) which is assigned a representing color identifier 194a or a sub color identifier 194b, and which is not yet given a group number g (YES in S412), the grouping unit 166 newly gives the smallest value of the numbers that are not yet used as a group number to all pixels, including the pixel under examination, within the predetermined range (S414).

In this manner, when within the predetermined range there are multiple target portions of which color identifiers are the same, grouping processing is performed by giving one group number g. At this occasion, the smallest value of the numbers that are not yet used as a group number is employed in order to avoid making a skipped number as much as possible upon group numbering. In so doing, the maximum value of the group number g does not become unnecessarily large, and the processing load can be reduced.

When the color identifier p is not a valid value, or it is a valid value but a group number g is already given (NO in S410) or when there is no other pixel of which color identifier 194 is the same, or there are other pixels of which color identifiers are the same and which are already given a group number g (NO in S412), the processing in step S416 subsequent thereto is performed.

Subsequently, the grouping unit 166 determines whether or not the horizontal variable i is equal to or more than 600 which is the maximum value of pixel number in the horizontal direction (S416). When the horizontal variable i is less than the maximum value (NO in S416), the processings are repeated from the increment processing of the horizontal variable i in step S406. When the horizontal variable i is equal to or more than the maximum value (YES in S416), the grouping unit 166 determines whether or not the vertical variable j is equal to or more than 200 which is the maximum value of pixel number in the vertical direction (S418). When the vertical variable j is less than the maximum value (NO in S418), the processings are repeated from the increment processing of the vertical variable j in step S404. When the vertical variable j is equal to or more than the maximum value (YES in S418), the grouping processing is terminated.

(Outer Edge Determining Processing S304)

Figure 13:
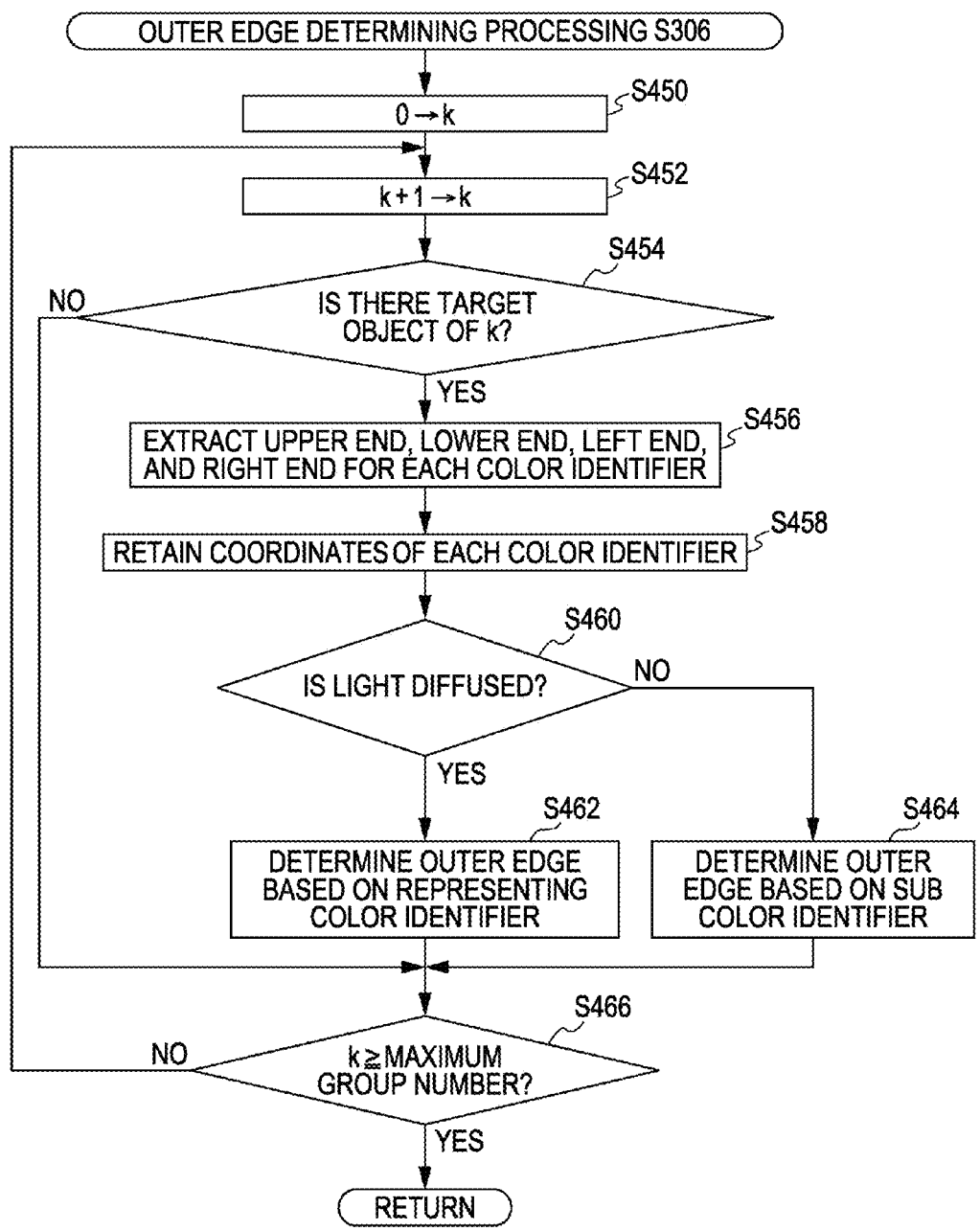
FIG. 13 is a flowchart illustrating a flow of outer edge determining processing.

As shown in FIG. 13, the grouping unit 166 initializes (substitutes "0" to) a group variable k for specifying a group (S450). Subsequently, the grouping unit 166 adds "1" to the group variable k (S452).

The grouping unit 166 determines whether or not there is a target object of which group number g is the group variable k from the luminance image 124 (S454). When there is such target object (YES in S454), the target portions to which the representative color identifier 194a or the sub color identifier 194b is assigned are extracted from the plurality of target portions to which the group number g is assigned. Then, for each of the representing color identifier 194a and the sub color identifier 194b, the grouping unit 166 extracts the target portion of which position in the width direction x is the leftmost (xl), the target portion of which position in the width direction x is the rightmost (xr), the target portion of which position in the height direction y is the minimum (ymin), and the target portion of which position in the height direction y is the maximum (ymax) (S456). The grouping unit 166 then retains the coordinates in the data retaining unit 152 in association with the group number g (S458).

The environment determining unit 168 determines whether or not the detection area 122 is in the environment were light is diffused due to rainfall or snowfall based on the detection information (S460). When the detection region 122 is in the environment where light is diffused (YES in S460), the outer edge determining unit 170 determines an outer edge based on the coordinates for the representing color identifier 194a retained in the data retaining unit 152 (S462). When the detection area 122 is in the environment where light is not diffused. (NO in S460), the outer edge determining unit 170 determines an outer edge based on the coordinates for the sub color identifier 194b retained in the data retaining unit 152 (S464). When the target portion corresponding to the representing color identifier 194a is not included in the target portion corresponding to the sub color identifier 194b, the outer edge is preferably determined based on the coordinates for the representing color identifier 194a and the sub color identifier 194b.

Subsequently, the grouping unit 166 determines whether or not the group variable k is equal to or more than the maximum value of group number set in the grouping processing (S466). Then, when the group variable k is less than the maximum, value (NO in S466), the processings are repeated from the increment processing of the group variable k in step S452. When the group variable k is equal to or more than the maximum value (YES in S466), the outer edge determining processing is terminated.

(Specific Object Determining Processing S306)

Figure 14:
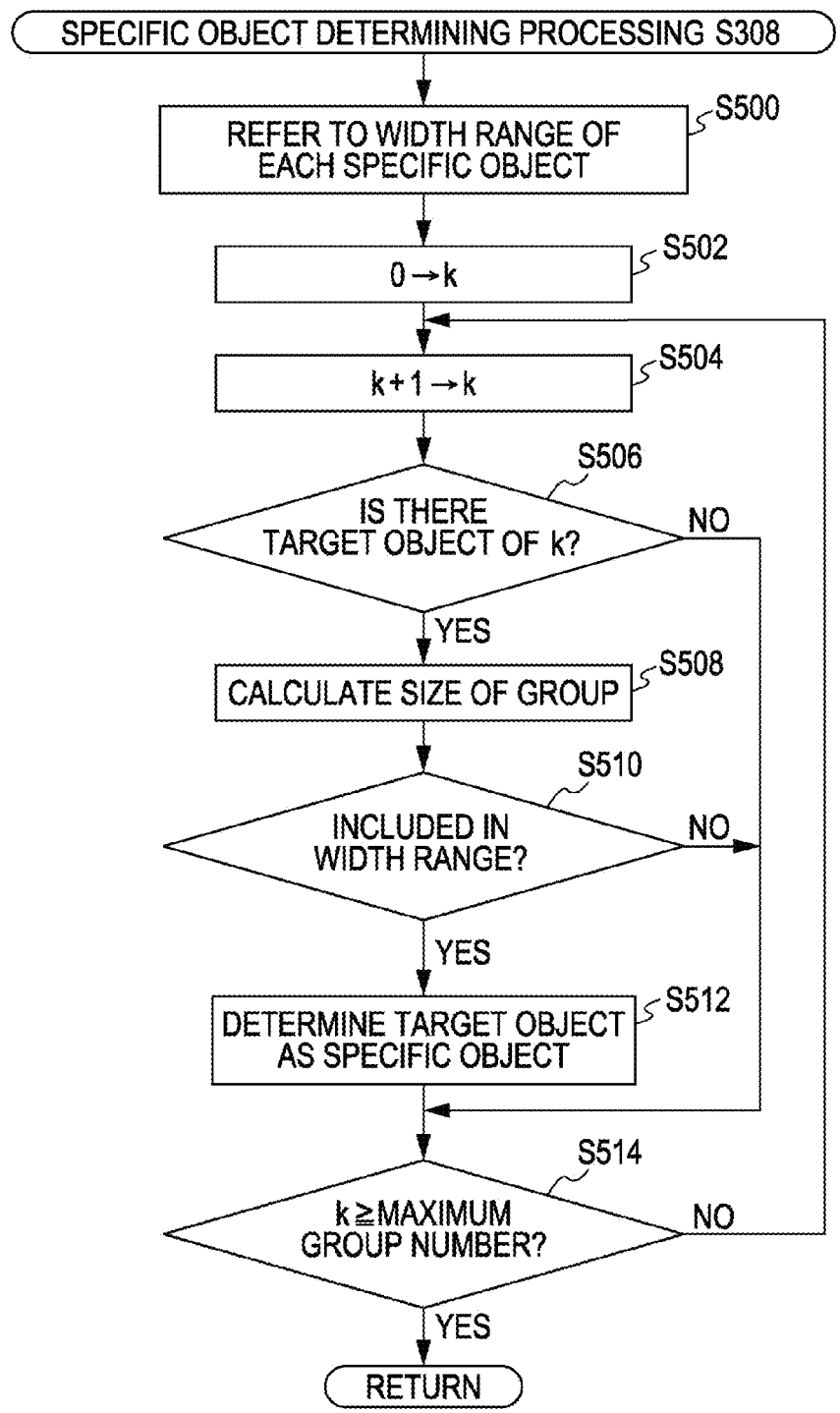
FIG. 14 is a flowchart illustrating a flow of specific object determining processing.

As shown in FIG. 14, the specific object determining unit 172 refers to the width range 202 for each specific object in the specific-object table 200 (S500), and initializes (substitutes "0" to) a group variable k for specifying a group (S502). Subsequently, the specific object determining unit 172 adds "1" to the group variable k (S504).

The specific object determining unit 172 determines whether or not there is a target object of which group number g is the group variable k from the luminance image 124 (S506). When there is such target object (YES in S506), the specific object determining unit 168 calculates the size of the target object to which the group number g is given based on the outer edge determined in she outer edge determining processing (S508). Then, a determination is made as to whether or not the calculated size is included within the width range 202 of a specific object associated with the representing color identifier p according to the target object of which group number g is the group variable k (S510). For example, if the width direction component of the size of the target object falls within the width range 202 for the specific object associated with the representing color identifier p, and the height direction component of the size of the target object falls within the width range 202 for the specific object associated with the representing color identifier p, the target object can be determined to fall within the width range 202 for the specific object associated with the representing color identifier p.

When the size is included within the width range 202 of the specific object associated with the representing color identifier p (YES in S510), the specific object determining unit 172 determines that the target object is the specific object associated with the representing color identifier p (S512). When the size is not included within the width range 202 of the specific object associated with the representing color identifier p (NO in S510), or when there is no target object of which group number g is the group variable k (NO in S506), the processing in step S514 subsequent thereto is performed.

Subsequently, the specific object determining unit 172 determines whether or not the group variable k is equal to or more than the maximum value of group number set in the grouping processing (S514). Then, when the group variable k is less than the maximum value (NO in S514), the processings are repeated from the increment processing of the group variable k in step S504. When the group variable k is equal to or more than the maximum value (YES in S514), the specific object determining processing is terminated. As a result, the grouped target objects are formally determined to be the specific object.

As described above, the environment recognition device 130 can enhance the accuracy of specifying a target object in an environment where light is easily diffused such as in rainy weather, thereby avoiding false recognition.

One or more color identifiers 194 associated in the specific object table 200 are defined only with the color identifiers 194 in the color table 190 defined in advance, and therefore, unnecessarily frequent, determination of luminance ranges is not performed, and only a predetermined number of luminance ranges 192 are examined. Therefore, the processing load can be greatly reduced.

In addition, a program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the specific object table 200 in the embodiment explained above, only the color identifiers 194 defined in the color table 190 in advance are associated with the specific objects, but any multiple luminance ranges may be associated with each specific object.

In the above embodiment, the three-dimensional position of the target object is derived based on the parallax between image data using the plurality of imaging devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

The above embodiment describes an example in which the position information obtaining unit 162 receives the distance image (parallax information) 126 from the image processing device 120, and generates the three-dimensional position information. However, the present invention is not limited to such case. The image processing device 120 may generate the three-dimensional position information in advance, and the position information obtaining unit 162 may obtain the generated three-dimensional position information. Such a functional distribution can reduce the processing load of the environment recognition device 130.

In the present embodiment, it is assumed that the imaging device 110 obtains a color image. However, the present invention is not limited to such case. Alternatively, a monochrome image may be obtained. In this case, the color table 190 is defined by a single-color luminance.

In the above embodiment, the luminance obtaining unit 160, the position information obtaining unit 162, the color identifier assigning unit 164, the grouping unit 166, the environment determining unit 168, the outer edge determining unit 170, the specific object determining unit 172, and the pattern matching unit 174 are configured to be operated by the central control unit 154 with software. However, the functional units may be configured with hardware.

The specific object determining unit 168 determines a specific object by, for example, whether or not the size of the target object is included within the width range 202 of the specific object. However, the present invention is not limited to such case. The specific object determining unit 168 may determine a specific object when various other conditions are also satisfied. For example, a specific object may be determined when a gradient, difference in the depth direction z to difference in the width direction x or difference in the depth direction z to difference in the height direction y, is substantially constant (continuous) in a target object or when the relative movement speed in the depth direction z is constant. Such a gradient may be specified by linear approximation by the Hough transform or the least squares method.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminances of the target object in a detection area.

The invention claimed is:

1. An environment recognition device comprising:
a data retaining unit that retains association between a predetermined number of color identifiers and a luminance range, retains association between the color identifiers and each specific object, and retains association between a combination of one or more color identifiers selected from the plurality of color identifiers and each detection result, as to whether a detection area is in an environment where light is diffused;
a luminance obtaining unit that obtains a luminance of a target portion in the detection area of a luminance image;
a color identifier assigning unit that assigns a color identifier to the target portion according to the luminance of the target portion based on the association between the color identifier and the luminance range retained in the data retaining unit;
a grouping unit that groups target portions, which are assigned one of color identifiers corresponding to a same specific object, and of which positions differences in the horizontal direction and in the vertical direction are within a predetermined range, into a target object, based on the association between a specific object and a color identifier retained in the data retaining unit;
an environment determining unit that determines whether or not the detection area is in an environment where light is diffused; and
an outer edge determining unit that selects a combination according to whether the detection area is in the environment where light is diffused and determines that an outer edge specified by a target portion assigned one of the selected color-identifier combination is an outer edge of the target object.

2. The environment recognition device according to claim 1, further comprising:
a rainfall detecting unit that detects rainfall,
wherein the environment determining unit determines that the detection area is in the environment where light is diffused, when the rainfall detecting unit detects rainfall.

3. The environment recognition device according to claim 1, further comprising:
a snowfall detecting unit that detects snowfall,
wherein the environment determining unit determines that the detection area is in the environment where light is diffused, when the snowfall detecting unit detects snowfall.

4. The environment recognition device according to claim 2, further comprising:
a snowfall detecting unit that detects snowfall,
wherein the environment determining unit determines that the detection area is in the environment where light is diffused, when the snowfall detecting unit detects snowfall.

5. The environment recognition device according to claim 1, wherein
the data retaining unit retains association a combination one or more color identifiers selected from the color identifiers and each level of the light diffusion condition,
the environment determining unit determines the light diffusion condition in a stepwise manner, and
the outer edge determining unit selects the combination according to the light diffusion condition, and determines that an outer edge specified by a target portion assigned one of the selected color-identifier combination is the outer edge of the target object.

6. The environment recognition device according to claim 2, wherein
the data retaining unit retains association a combination one or more color identifiers selected from the color identifiers and each level of the light diffusion condition,
the environment determining unit determines the light diffusion condition in a stepwise manner, and
the outer edge determining unit selects the combination according to the light diffusion condition, and determines that an outer edge specified by a target portion assigned one of the selected color-identifier combination is the outer edge of the target object.

7. The environment recognition device according to claim 3, wherein
the data retaining unit retains association a combination one or more color identifiers selected from the color identifiers and each level of the light diffusion condition,
the environment determining unit determines the light diffusion condition in a stepwise manner, and the outer edge determining unit selects the combination according to the light diffusion condition, and determines that an outer edge specified by a target portion assigned one of the selected color-identifier combination is the outer edge of the target object.

8. An environment, recognition method comprising:

obtaining a luminance of a target portion in a detection area in an luminance image;

assigning a color identifier to the target region according to the luminance of the target portion based on an association between a color identifier and a luminance range retained in a data retaining unit;

grouping target portions, which are assigned one of one or more color identifiers associated with a same specific object, and of which positions differences in the horizontal direction and the vertical direction, are within a predetermined range, based on the association between a specific object and a color identifier retained in the data retaining unit;

determining whether or not the detection area is in an environment where light is diffused;

selecting a combination according to whether or not the detection area is in the environment where light is diffused, based on an association, retained in the data retaining unit, between each detection result as to whether or not the detection area is in the environment where light is diffused and a combination of color identifiers selected from the color identifiers; and determining that an outer edge of specified by the target portion assigned one of the selected color-identifier combination is the outer edge of the target object.

* * * * *